United States Patent [19]

Croucher

[11] 4,039,434
[45] Aug. 2, 1977

[54] SUGAR CANE HARVESTER CANE CONVEYOR ROLLER

[75] Inventor: Kenneth W. Croucher, North Bundaberg, Australia

[73] Assignee: Massey-Ferguson Services N.V., Curacao, Netherlands Antilles

[21] Appl. No.: 647,546

[22] Filed: Jan. 8, 1976

[30] Foreign Application Priority Data

Jan. 17, 1975 United Kingdom ............... 02052/75

[51] Int. Cl.² ............................................. B07B 9/00
[52] U.S. Cl. ...................................... 209/28; 56/12.8; 209/285; 209/289
[58] Field of Search ............................. 209/3, 26–29, 209/136–139 R, 250, 247, 285, 288, 45, 46, 289, 295; 55/400, 406; 56/12.8, 13.3, 14.6; 171/129, 132

[56] References Cited

U.S. PATENT DOCUMENTS

| 1,864,484 | 6/1932 | Currie | 171/129 X |
| 2,145,330 | 1/1939 | Anderson | 209/285 X |
| 2,624,458 | 1/1953 | Molnau | 209/285 X |
| 3,002,623 | 10/1961 | Fontaine | 209/288 |
| 3,361,258 | 1/1968 | Kalke | 209/285 X |
| 3,673,774 | 7/1972 | Mizzi | 56/13.3 X |
| 3,925,199 | 12/1975 | Quick | 209/3 |

Primary Examiner—Frank W. Lutter
Assistant Examiner—Ralph J. Hill
Attorney, Agent, or Firm—Robert L. Farris

[57] ABSTRACT

A sugar cane harvester having walls defining a channel through which harvested sugar cane is to be conveyed. Power-rotated conveyor rollers extending across the channel move the cane through the channel. At least one of the rollers is in the form of a drum of expanded metal which allows escape from the cane of earth and rocks and permits inflow of air to trash removal apparatus.

3 Claims, 4 Drawing Figures

SUGAR CANE HARVESTER CANE CONVEYOR ROLLER

This invention relates to sugar cane harvesters and in particular to cane conveyor rollers for sugar cane harvesters.

Cane conveyor rollers presently in use on sugar cane harvesters comprise a series of radial paddles which engage gathered sugar cane sticks and feed them into and through the harvesters. Such paddle rollers suffer from the disadvantage that, although good from the cane-feeding point of view they tend to feed stones and soil into the harvester with the cane. Also, when used in trash extraction zones in the harvester, the efficiency of the trash extraction apparatus is lower than would have been expected.

An object of the present invention is to provide a cane conveyor roller having improved performance as regards elimination of stones and soil or other trash such as sugar cane leaves, from harvested crop.

Figure 1:
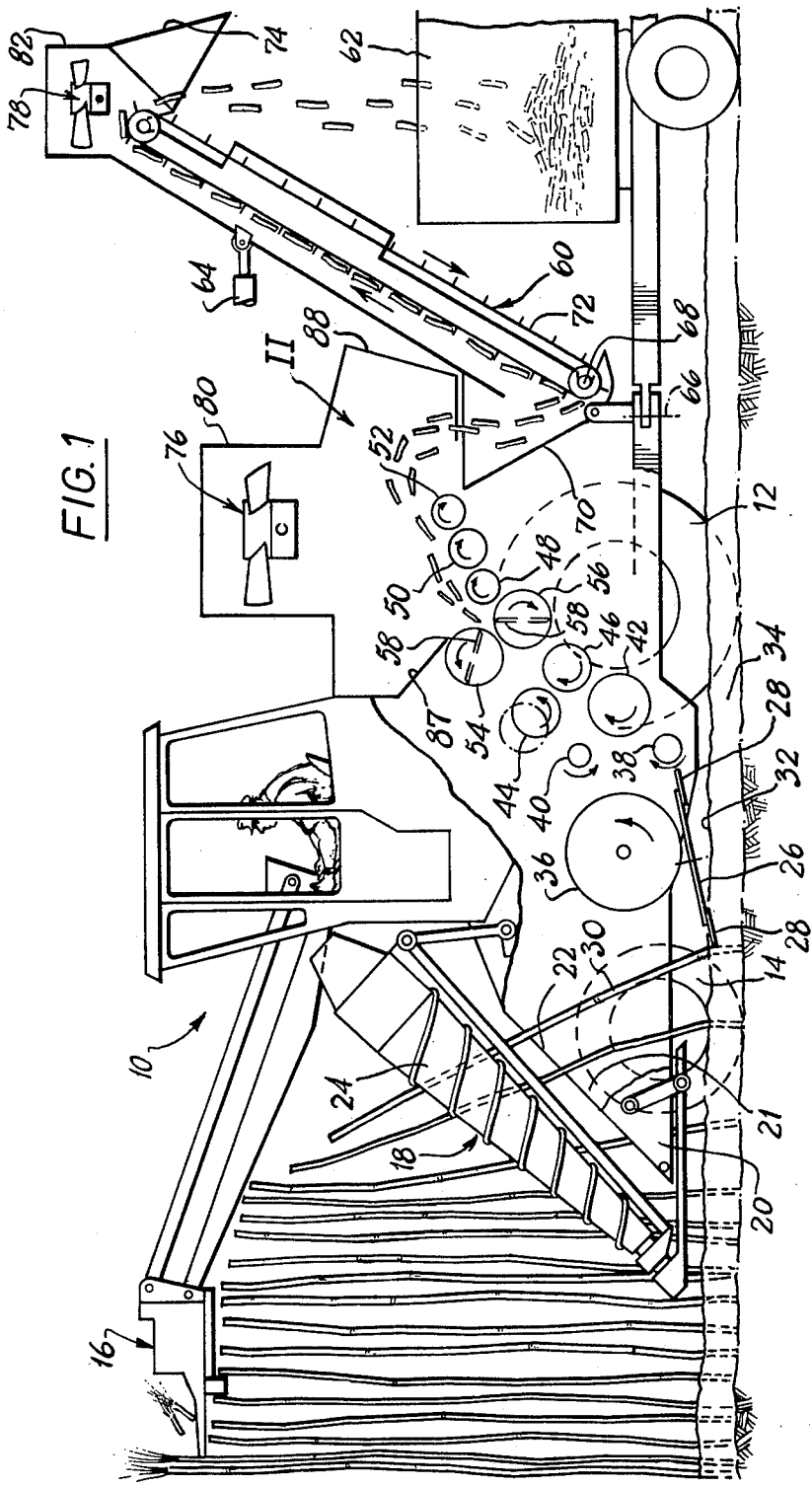
FIG. 1 shows a sugar cane harvester in side elevation and partly cut-away.

As shown in the drawings, a sugar cane harvester 10 comprises rear traction wheels 12, forward steerable wheels 14, a cane top cutting unit 16 and cane gathering means 18.

The can gathering means comprises a pair of transversely spaced, vertical, rearwardly converging gathering walls 20, 21, each having a sloping leading edge 22 surmounted by a power-rotatable spiral crop lifter 24.

A pair of contra-rotatable base cutting discs 26 each having projecting blades 28 are mounted below the throat defined by walls 20, 21 to sever the cane sticks 30 just below the surface 32 of the soil ridges 34 in which the canes are grown.

Can conveying means is provided to feed cane sticks into and through the harvester after they have been severed from their roots by base cutters 26. The cane conveying means comprises a large paddle type feed-in roller 36, a butt lifter roller 38, a first pair of cane conveyor rollers 40, 42, a second pair of cane conveyor rollers 44, 46, and three conveyor rollers 48, 50, 52 known in the art as flipper rollers. Roller 44 is mounted so as to be movable away from roller 46 to accommodate varying thicknesses of cane layer.

Between the second pair of conveyor rollers 44, 46 and the first flipper roller 48 there is provided cane divided cane dividing means in the form of a pair of contra-rotatable cane chopper drums 54, 56 each having a pair of axially extending projecting blades 58. The blades meet as the drums rotate in timed relationship, so as to chop canes passing between the drums.

An elevator conveyor 60 is provided to collect the cane pieces or billets and raise them to a height from which they can be conveniently discharged into a trailer 62 or other transport vehicle. The elevator is pivotable by means of hydraulic rams (only one, 64, shown) about a vertical axis 66 and a horizontal axis 68 to select the discharge position. The elevator comprises a hopper 70 to collect billets, a chain and slat type endless conveyor 72 and a discharge hood 74.

Two axial flow trash extractor fans 76, 78 are provided to remove cane leaves and other light material from the cane billets as they pass over the flipper rollers 48, 50, 52 and as they are discharged from conveyor 60 respectively. The fans are mounted in respective vertical trash discharge ducts 80, 82.

The cane conveyor rollers 36 to 46 and 48 to 52 are mounted between walls 84, 86 (see FIG. 2) defining a channel through which the sugar cane is conveyed. A transverse wall 87 is provided above choppers 54, 56 to define a trash extraction zone. A hood 88 and inwardly projecting flanges 90 fixed to walls 84, 86 guide billets into hopper 70.

Flipper rollers 48 and 52 are substantially identical in construction to each other, comprising a central tube or shaft 92, end flanges 94 and radial slats or paddles 96.

Figure 2:
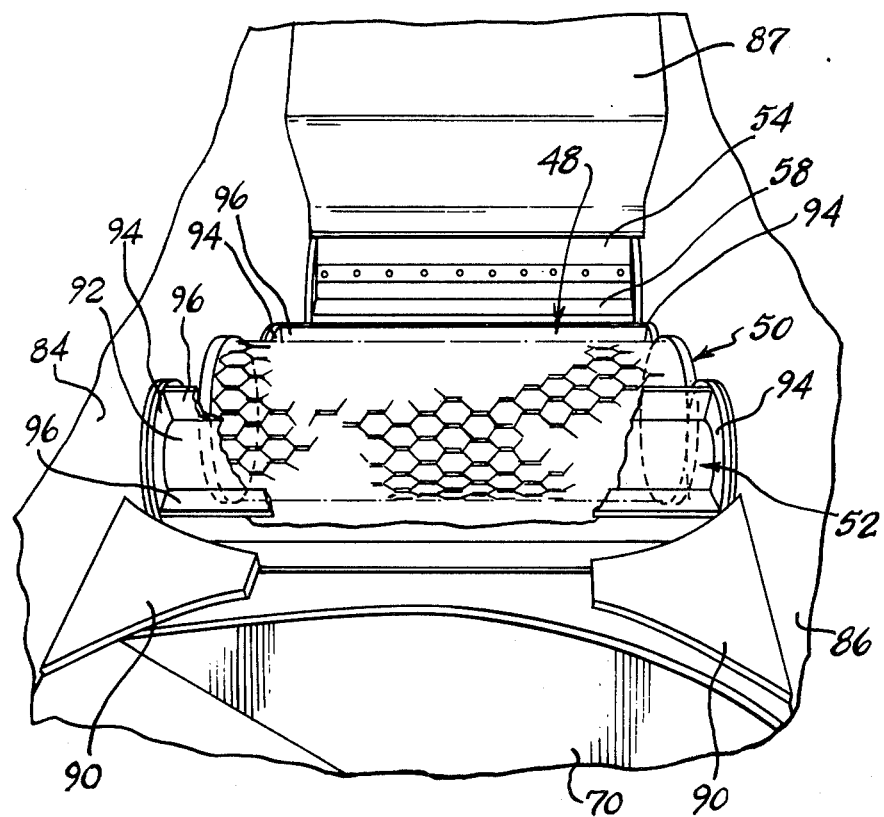
FIG. 2 shows a perspective view in the direction indicated by arrow II in FIG. 1 of a portion of cane conveying means of the harvester of FIG. 1.
Figure 3:
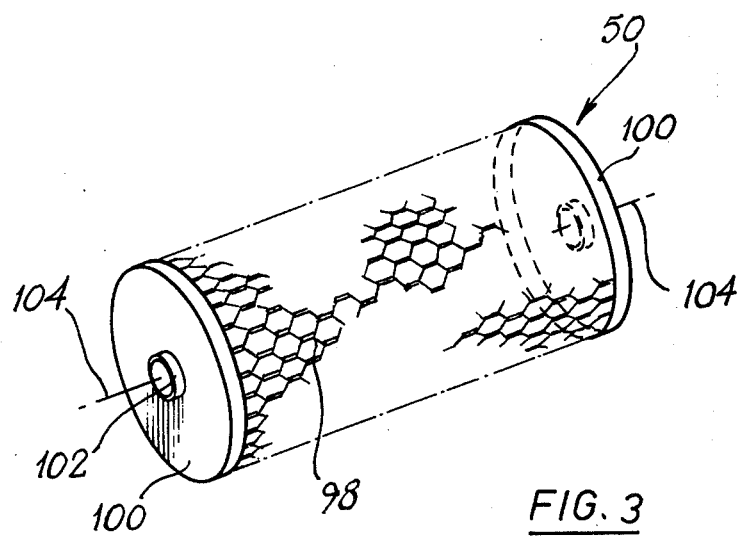
FIG. 3 shows a perspective view of a cane conveyor roller also seen in FIG. 2.
Figure 4:
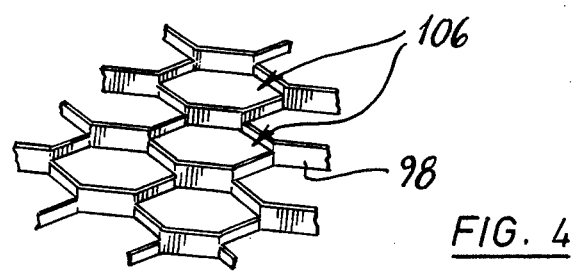
FIG. 4 shows a perspective view of a portion of a drum of mesh material forming part of the roller of FIG. 3.

As shown in FIGS. 2 to 4, flipper roller 50 comprises a drum 98 of mesh material in the form of expanded metal. The drum is supported by end plates 100 having bearings 102 whereby the roller is rotatable about an axis 104.

As can be seen in FIG. 4, the openings 106 in the drum 98 of mesh material are hexagonal in shape. The size of the openings is large enough to permit a sphere of ½ inch diameter to pass through. Larger openings could be used provided the mesh material has adequate strength and rigidity.

As regards the detailed structure of the other rollers of the cane conveying means, the two upper rollers 40, and 44 are of paddle type construction similar to flipper rollers 48 and 52. The lower rollers 46, 42 and 38 (the latter being the butt lifter roller) have substantially the same structure as flipper roller 50, though (as indicated in FIG. 1) they have differing diameters.

In use, the cane sticks 30 are severed by base cutters 26 and fed into the harvester, butt first, by feed-in roller 36 and conveyed by rollers 38 to 46 to the cane chopper drums 54 56 which chop the canes into billets about 30 to 40 centimeters in length. The billets are conveyed rearwards in an airborne stream by flipper rollers 48, 50 and 52, drop into hopper 70 and are elevated by elevator 60 before being dropped into trailer 62. Fans 76 and 78 pull air through the flow of billets and the leafy trash is thereby extracted and discharged through the ducts 80 and 82.

Advantages arising from the use of mesh material in rollers 38, 42, 46 and 50 are as follows:

1. the open structure allows stones, soil and the like to fall through the mesh and return to the ground — thereby producing cleaner cane in trailer 62. This applies particularly to butt lifter roller 38 and feeding and cleaning rollers 42 and 46;

2. the elimination of slats or paddles from the rollers reduces the tendency of the rollers to beat or paddle stones and soil into the harvester with the cane — this applies particularly to butt lifter roller 38;

3. the mesh material grips the cane effectively and produces a more even cane feeding action;

4. the mesh material allows air to pass freely through the roller — thereby assisting the free flow of air through the cane as it passes through the trash extraction zone. This applies particularly to flipper roller 50. The passage of air in between the cane billets as opposed to around or over the mass of billets is particularly important in removing trash mixed with the billets.

Roller 50 ensures that air passes upwards between the cane pieces.

It is to be understood that the mesh material drum of the cane conveyor rollers need not be cylindrical but could have a non circular cross-sectional shape e.g. that of a hexagon. Also the mesh material itself need not necessarily be metallic. The term "mesh material" is to be construed as covering perforated sheet material in which the perforations are made otherwise than by the techniques which produce expanded metal. For example sheet steel having perforations of a suitable size and spacing could be used in place of expanded metal in the above embodiment.

We claim:

1. A sugar cane harvester including a frame, cane gathering means mounted on the forward portion of the frame, wall members mounted on the frame to form the sides of a channel and guide cane along the channel, a plurality of rollers rotatably mounted on the frame and extending from one wall member to the other wall member to form a bottom to said channel, drive means to rotate the rollers about axes which are generally perpendicular to said walls to convey cane along the channel, at least one of said plurality of rollers including an outer periphery of mesh material which will allow the passage of air and will convey cane along said channel, and an extractor fan mounted on the frame above at least some of the rollers for pulling air up through the roller with an outer periphery of mesh material, through cane that is being conveyed along the channel and for forcing air and entrained trash from the cane out of the harvester.

2. The sugar cane harvester of claim 1 with at least two of said plurality of rollers having an outer periphery of mesh material.

3. The sugar cane harvester of claim 1 wherein said mesh material is expanded metal.

* * * * *